May 2, 1961 P. GOLDBERG 2,982,876
PHOSPHOR
Filed June 26, 1958
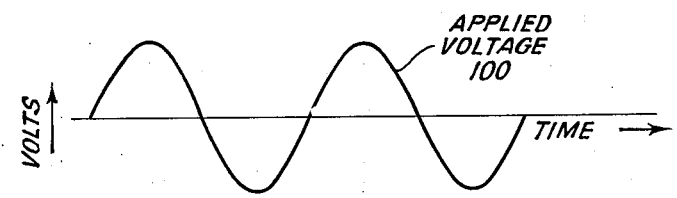
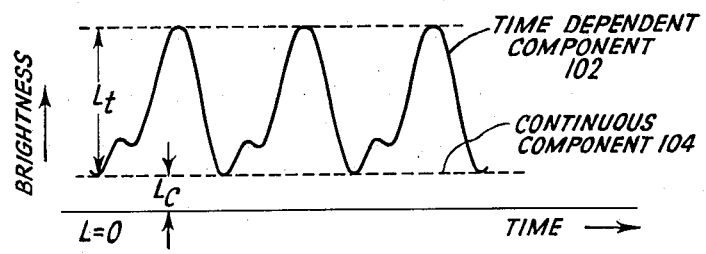
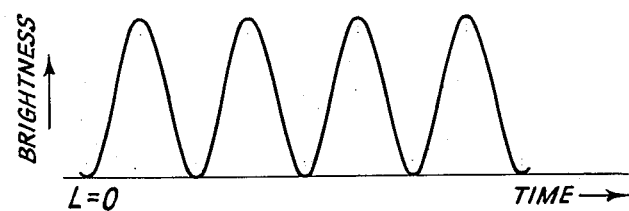
INVENTOR
PAUL GOLDBERG
BY
ATTORNEY United States Patent Office 2,982,876
Patented May 2, 1961

2,982,876
PHOSPHOR
Paul Goldberg, Long Beach, N.Y., assignor, by mesne assignments, to Sylvania Electric Products Inc., Wilmington, Del., a corporation of Delaware
Filed June 26, 1958, Ser. No. 744,868
3 Claims. (Cl. 313—108)

My invention relates to electroluminescent phosphors and to devices utilizing such phosphors.

Electroluminescent phosphors are phosphors which emit light in the presence of an electric field. Conventionally, such phosphors are dispersed in dielectric media and the dispersion is placed between two electrically conductive electrodes, at least one of which permits the passage of light therethrough, to produce an electroluminescent lamp. An alternating voltage is applied between the two electrodes and light is emitted from the dispersion. The intensity of the light emitted varies with time at twice the frequency of the applied voltage, thus producing a "brightness wave." The brightness wave can be regarded as being composed of two components. The first component, the "time dependent" component $L_t$, varies at a rate dependent upon the frequency of the applied voltage in the manner previously indicated. The second component, the "continuous component" $L_c$, remains essentially constant; it does not vary with time.

At low frequencies, for example 100 cycles per second, the ratio of the light emitted by the time dependent component to the total or integrated light output of he entire brightness wave, i.e. the ratio $L_t/(L_t+L_c)$, is relatively high as, for example, on the order of 0.75 or more. However, as the frequency is increased, this ratio decreases until, at a frequency of several kilocycles, the time dependent component contributes only fifty percent or less to the total light output.

I have invented a new type of electroluminescent phosphor wherein the effect of the continuous component $L_c$ is minimized and indeed can be substantially eliminated. Hence, the resulting brightness wave has a minimum value of zero and is therefore fully modulated. Phosphors of this type can be advantageously employed, for example, in devices such as light amplifiers and memory storage elements which employ combinations of electroluminescent and photoconductor layers.

Accordingly it is an object of my invention to provide a new and improved electroluminescent phosphor which, when dispersed in dielectric and utilized in an electroluminescent device, produces a brightness wave having a minimized continuous component and an accentuated time dependent component.

Another object is to provide a new and improved electroluminescent device which, when excited by an alternating voltage, produces a brightness wave having a minimized continuous component and an accentuated time dependent component.

Still another object is to provide new and improved electroluminescent phosphor and devices of the characteristics indicated.

In accordance with the principles of my invention, my phosphor is composed of a base material selected from the class consisting of zinc sulfide and zinc cadmium sulfide, wherein up to 20 mole percent of cadmium can be substituted for an equivalent mole percent of zinc. This material is activated with copper and coactivated with at least one halide coactivator selected from the class consisting of chloride, bromide and iodide, the activator and coactivator concentrations falling within the same approximate range of $1\times10^{-4}$—$5\times10^{-3}$ gram atoms per mole of base material.

Further, my phosphor contains an element selected from the class consisting of cobalt and nickel. When the element is nickel, the concentration falls within the approximate range $0.5\times10^{-4}$—$1.0\times10^{-3}$ gram atoms per mole of the base material; when the element is cobalt, the concentration falls within the approximate range $0.5\times10^{-5}$—$1\times10^{-4}$ gram atoms per mole of base material.

When an alternating voltage is applied across the electrodes of an electroluminescent lamp containing my phosphor dispersed in dielectric, a brightness wave is produced. In contradistinction to the behavior of known phosphors and devices, the brightness wave is primarily composed of the first or time dependent component, the second or continuous component being greatly reduced. More particularly, the intensity of the time dependent component is at least 19 to 20 times as large as the intensity of the continuous component, and the ratio $L_t/(L_t+L_c)$ previously defined is correspondingly increased.

My phosphor can be produced by means of the process disclosed in my copending patent application Serial No. 705,750, filed December 30, 1957. In this process, the activator and coactivator are mixed together. The mixture is then fired to a temperature falling within the approximate range 1000°–1300° C. to produce an intermediate product having the activator-coactivator concentrations previously indicated. The intermediate product is then mixed with at least $1\times10^{-5}$ gram atoms per mole of copper activator and refired at a temperature falling within the approximate range 750°–950° C. to produce the final product.

In order to produce my phosphor, cobalt or nickel, in the concentrations previously indicated, can be added at any step in the above process. Alternatively, the cobalt or nickel can be mixed with the final product of this process, and this mixture can be again refired to a temperature falling within the approximate range 750°–950° C. to produce my phosphor.

Illustrative embodiments of my invention will now be described with reference both to the examples which follow and to the accompanying drawings wherein:

Fig. 1 illustrates the wave form of a sinusoidal alternating voltage of fixed frequency;

Fig. 2 is a graph of the brightness wave of light emitted from an electroluminescent lamp containing known electroluminescent phosphors when a voltage type shown in Fig. 1 is applied to this lamp; and Fig. 3 is a graph of the brightness wave of light emitted from an electroluminescent lamp containing my phosphor when a voltage of the type shown in Fig. 1 is applied to this lamp.

*Example I*

Zinc sulfide and cadmium sulfide powders are thoroughly mixed together, the mixture containing 95% by weight of zinc sulfide and 5% by weight of cadmium sulfide and weighing 15 grams. Copper sulfate was thoroughly blended with this mixture in an amount sufficient to establish a copper concentration of $2 \times 10^{-4}$ gram atoms per mole of the sulfide mixture. A chloride flux was blended with the mixture in an amount equal to about 8% by weight of the sulfide mixture, this flux consisting of 3% barium chloride, 3% magnesium chloride and 2% sodium chloride, each percentage being by weight of the sulfide mixture. The resulting blend was fired in a covered crucible in air to a temperature of 1150° C. for six hours.

Copper sulfate was added to the intermediate product in an amount sufficient to increase the total copper concentration by $1 \times 10^{-4}$ gram atoms per mole of zinc sulfide. The copper-augmented mixture was then fired in a covered crucible in air to a temperature of 800° C. for about one hour. The furnace was shut off, and the crucible was permitted to cool for several hours in the furnace.

The product resulting from this second firing is a blue electroluminescent phosphor.

A portion of this phosphor was then dispersed in a dielectric, and the dispersion was placed between two conductive electrodes to form an electroluminescent lamp in a manner well known to the art.

When a sinusoidal voltage of 1000 c.p.s. having the wave form indicated in Fig. 1 was applied to this cell, blue light was emitted. The resulting brightness wave, as shown in Fig. 2, had a time dependent component $L_t$ (identified at 102) and a continuous component $L_c$ (identified at 104). The ratio $L_t/(L_t+L_c)$ was found to be about 0.25.

Nickel sulfate was added to a portion of the copper augmented mixture (i.e. the mixture just prior to the second firing step), there being $1 \times 10^{-4}$ gram atoms of nickel per mole of phosphor. This mixture was then fired in a covered crucible in air to a temperature of 800° C. The nickel-containing phosphor so produced was dispersed in a dielectric and the dispersion was placed between two electrodes to form an electroluminescent lamp in the same manner as previously described.

When a sinusoidal voltage of 10,000 c.p.s. having the wave form indicated in Fig. 1 was applied to the lamp, blue light was emitted as before. However, the resulting brightness wave, as shown in Fig. 3, was primarily composed of the time dependent component, the continuous component being substantially absent. This behavior was observed at frequencies as high as 20 kilocycles per second.

The above experiment was repeated using different concentrations of nickel sulfate and it was found that the same suppression of the continuous component of the brightness wave ensued as long as the nickel content was held within the approximate range $0.5 \times 10^{-4}$—$1 \times 10^{-3}$ gram atoms per mole of phosphor. However, it was found that as the nickel concentration was decreased much below $1 \times 10^{-4}$ gram atoms per mole of base material, the frequency range in which the continuous component was effectively absent decreased. Further, when the nickel concentration was increased much above $1 \times 10^{-4}$ gram atoms per mole of base material, the frequencies in which the continuous component was effectively absent were increased beyond 20 kilocycles per second, but the brightness of the nickel containing phosphor was decreased.

*Example II*

Experiment I was repeated, substituting cobalt nitrate for nickel sulphate. The results were essentially the same, except the optimum concentration of cobalt (i.e. the amount required for the continuous component to be effectively absent at frequencies up to about 20 kilocycles per second) was found to be about $1 \times 10^{-5}$ gram atoms of cobalt per mole of phosphor, and the range in which the cobalt addition was effective was found to be approximately $0.5 \times 10^{-5}$—$1 \times 10^{-4}$ gram atoms of cobalt per mole of phosphor.

I have found that these cobalt or nickel additions can be made to any of the zinc sulfide or zinc sulfide-cadmium sulfide phosphors described in the aforementioned patent application Serial No. 705,750, and the brightness waves of these phosphors will be modified in the same manner as taught herein.

Further, it is the nickel or cobalt concentration and not the nickel or cobalt salt concentration which determines the brightness wave characteristics. The nickel or cobalt can be added in the form of any convenient salt, such as a sulfate or nitrate, or can be added in metallic form.

What is claimed is:

1. An electroluminescent lamp having first and second separated electrodes, at least one of said electrodes permitting the passage of light therethrough, and an electroluminescent phosphor interposed between said electrodes, said phosphor comprising a base material selected from the class consisting of zinc sulfide and zinc cadmium sulfide wherein up to 20 mole percent of cadmium can be substituted for an equivalent mole percent of zinc; said material containing a copper activator and at least one halide coactivator selected from the class consisting of chloride, bromide and iodide, the activator and coactivator concentrations both falling within the same approximate range of $1 \times 10^{-4}$—$5 \times 10^{-3}$ gram atoms per mole of base material, said phosphor further containing an element selected from the group consisting of cobalt and nickel, the nickel concentration falling within the approximate range $0.5 \times 10^{-4}$—$1.0 \times 10^{-3}$ gram atoms per mole of base material, the cobalt concentration falling within the approximate range of $0.5 \times 10^{-5}$—$1.0 \times 10^{-4}$ gram atoms per mole of base material, and means to apply an alternating voltage between said electrodes, the brightness wave of the light emitted being primarily composed of the time dependent component, the continuous component being essentially absent.

2. An electroluminescent lamp having first and second separated electrodes, at least one of said electrodes permitting the passage of light therethrough, and an electroluminescent phosphor interposed between said electrodes, said phosphor comprising a base material selected from the class consisting of zinc sulfide and zinc cadmium sulfide wherein up to 20 mole percent of cadmium can be substituted for an equivalent mole percent of zinc; said material containing a copper activator and at least one halide coactivator selected from the class consisting of chloride, bromide and iodide, the activator and coactivator concentrations both falling within the same approximate range of $1 \times 10^{-4}$—$5 \times 10^{-3}$ gram atoms per mole of base material, said phosphor further containing an element selected from the group consisting of cobalt and nickel, the nickel concentration falling within the approximate range of $0.5 \times 10^{-4}$—$1.0 \times 10^{-3}$ gram atoms per mole of base material, the cobalt concentration falling within the approximate range of $0.5 \times 10^{-5}$—$1 \times 10^{-4}$ gram atoms per mole of base material, and means to apply an alternating voltage between said electrodes, the brightness wave of the emitted light being composed of a time dependent component $L_t$ and a continuous component $L_c$, the ratio $L_t/(L_t+L_c)$ approximating but being less than unity.

3. An electroluminescent lamp having first and second separated electrodes, at least one of said electrodes permitting the passage of light therethrough, and an electroluminescent phosphor interposed between said electrodes, said phosphor comprising a base material selected from the class consisting of zinc sulfide and zinc cadmium sulfide wherein up to 20 mole percent of cadmium can be substituted for an equivalent mole percent of zinc; said material containing a copper activator and at least one halide coactivator selected from the class consisting of chloride, bromide and iodide, the activator and coactivator concentrations both falling within the same approximate range of $1 \times 10^{-4}$—$5 \times 10^{-3}$ gram atoms per mole of base material, said phosphor further containing an element selected from the group consisting of cobalt and nickel, the nickel concentration falling within the approximate range of $0.5 \times 10^{-4}$—$1.0 \times 10^{-3}$ gram atoms per mole of base material, the cobalt concentration falling within the approximate range of $0.5 \times 10^{-5}$—$1 \times 10^{-4}$ gram atoms per mole of base material, and means to apply an alternating voltage between said electrodes, the brightness wave of the emitted light varying with time between essentially a zero value and a maximum value dependent upon the amplitude of said voltage, the frequency of variation of said wave being twice the frequency of said voltage.

References Cited in the file of this patent
UNITED STATES PATENTS

| | | |
|---|---|---|
| 2,698,915 | Piper | Jan. 4, 1955 |
| 2,774,902 | Burns | Dec. 18, 1956 |
| 2,780,731 | Miller | Feb. 5, 1957 |